United States Patent [19]
Keathley

[11] Patent Number: 5,415,448
[45] Date of Patent: May 16, 1995

[54] UNIVERSAL REPLACEMENT TOOL HANDLE COMBINATION

[75] Inventor: Bob N. Keathley, Bernie, Mo.

[73] Assignee: IXL Manufacturing Company, Inc., Bernie, Mo.

[21] Appl. No.: 104,289

[22] Filed: Aug. 11, 1993

[51] Int. Cl.[6] ............................................. B25G 3/02
[52] U.S. Cl. .................................... 294/57; 294/49; 16/114 R
[58] Field of Search ................... 294/49, 51, 57, 58, 294/59; 76/111, 113, 119; 403/268, 292, 314; 16/110 R, 114 R, DIG. 18, DIG. 24

[56] References Cited

U.S. PATENT DOCUMENTS

| | | |
|---|---|---|
| Re. 32,364 | 2/1987 | Carmien . |
| 969,975 | 9/1910 | Olmsted .............................. 294/57 X |
| 1,241,189 | 9/1917 | Boone .................................... 294/57 |
| 1,601,170 | 2/1927 | Cunningham ......................... 294/57 |
| 2,178,509 | 10/1939 | Brandenburg . |
| 3,519,294 | 7/1970 | Barnes . |
| 3,549,189 | 12/1970 | Alosi . |
| 4,050,727 | 9/1977 | Bonnes . |
| 4,406,559 | 9/1983 | Geertsema et al. ................ 294/57 X |
| 4,451,073 | 5/1984 | Carmien . |
| 4,570,988 | 2/1986 | Carmien ................................ 294/57 |
| 4,639,029 | 1/1987 | Kolonia ......................... 16/110 R X |
| 4,790,586 | 12/1988 | Stoner . |
| 5,211,669 | 5/1993 | Bonnes et al. ..................... 294/57 X |
| 5,213,014 | 5/1993 | Carmien ............................. 294/57 X |

*Primary Examiner*—Dean J. Kramer
*Attorney, Agent, or Firm*—Neil F. Markva

[57] ABSTRACT

The universal replacement handle of this invention may be used with a variety of tools such as shovels having a handle-receiving socket. The handle comprises a handle member having a tool coupling section at one end thereof and a hand-grasping section extending outwardly from the tool coupling section. The tool coupling section includes a plurality of socket adaptors effective to cause the handle to fit the handle-receiving sockets of a variety of shovels selected from the group consisting of a handle back shovel with a shoulder, a Razorback ® open back shovel, a lock socket shovel, a solid socket closedback shovel with a shoulder, and a solid shank closedback shovel without a shoulder. The tool coupling section includes first and second adaptor mounting sections for carrying respective first and second adaptor mechanisms having removable segments designed to adapt the handle to a particular handle-receiving socket.

20 Claims, 1 Drawing Sheet

UNIVERSAL REPLACEMENT TOOL HANDLE COMBINATION

FIELD OF THE INVENTION

This invention relates to replacement handles for tools such as pitchforks and shovels having handle-receiving sockets. More particularly, the invention is directed to a universal replacement handle designed for use with a variety of handle-receiving sockets for such tools.

BACKGROUND OF THE INVENTION

Traditionally, wood is used as handle material for tools such as pitchforks and shovels having handle-receiving sockets. Tool handles are fitted at the factory and must generally be autoclaved or steamed until malleable so that when driven into the socket, the outer end of the malleable wood handle is consequently shaped to fit the angled or curved section of the handle-receiving socket of the tool. Usually, the tool coupling end of the handle has one or more longitudinal slits to more easily fit the inside shape of the socket and allow the section to dry out after joining the handle to the socket.

Various types of handle-receiving sockets are found on pitchforks and shovels. For example, the various types of shovels include a hollowback shovel with a shoulder, a Razorback® open back shovel made by Union, a lock socket shovel, a solid socket closedback shovel with a shoulder, and a solid shank closedback shovel without a shoulder. Each of these tool handle-receiving sockets require a different shape and a different tool coupling end for the particular handle member used with the various shovels. Thus, retail distributors are required to carry a large variety of different replacement handles to fit the individual characteristics of each of the different types of tool handle-receiving sockets.

With respect to manufacturing, the production of specially shaped tool coupling ends on wooden handles is time consuming and expensive. The availability of wood having characteristics sufficient for use as a tool handle is less available today because of the increased demand and/or decreased wood supply.

The use of adaptor mechanisms on various types of handles to fit tool handle-receiving sockets for shovels is well known. However, these known adaptor mechanisms are generally used for specific structural conditions that are unique to a particular tool. For example, the U.S. Re. Pat. No. 32,364 discloses a flexible core that is used to fill the socket of a shovel for preventing the buckling or collapse of the socket during its use.

This known flexible core is used simply as a socket filler for bearing a compressive load in the handle-receiving socket while precluding the projection of the handle member itself into the socket. The flexible core is designed for a single type of tool-receiving socket, namely, a hollowback shovel with a shoulder.

This known socket filler is used with fiberglass or other tool handles which do not need to be fully inserted into a handle socket or cannot be fully inserted due to the curvature of the socket.

There is no known universal replacement tool handle combination particularly useful with wood handle members.

PURPOSE OF THE INVENTION

The primary purpose of this invention is to provide a universal replacement tool handle combination that may be used for replacing handles in various types of tools such as pitchforks and shovels having various configurations of handle-receiving sockets.

Another object of the invention is to provide a replacement tool handle which precludes the necessity for dealers to carry an inventory of a plurality of differing types of replacement handles.

A further object of the invention is to provide a tool adaptor means that is particularly useful with wood handles where a significant savings is effected through the use of less wood in the construction of the tool coupling section to be fitted into the handle-receiving socket of tools such as shovels and pitchforks.

These objects and other objects of the invention will become more readily understood based on the following summary of the invention and detailed description, in consideration of the accompanying drawings, which illustrate, by way of example, the principles of the invention.

SUMMARY OF THE INVENTION

The universal replacement handle of this invention may be used with a variety of tools, such as shovels and pitchforks, having a handle-receiving socket. The handle comprises a handle member including a tool coupling section at one end thereof and a hand-grasping section extending outwardly from the tool coupling section. The tool coupling section includes a plurality of socket adaptor means effective to cause the handle to fit a handle-receiving socket of a shovel selected from the group consisting of a hollowback shovel with a shoulder, a Razorback® open back shovel, a lock socket shovel, a solid socket closedback shovel with a shoulder, and a solid shank closedback shovel without a shoulder.

Another feature of the invention comprises a tool coupling section including first and second adaptor mounting sections. The socket adaptor means includes first and second adaptor means mounted to respective first and second adaptor mounting sections of the handle member. The first adaptor means includes a deformable first adaptor member having a removable sleeve portion and a shoulder portion. The second adaptor means includes a flexible portion and connecting means fixedly attached to the outer surface of the second reduced diameter of the handle member.

In a specific embodiment, the handle member is composed of wood and the first and second adaptor members are composed of injection-molded plastic material. The tool coupling section includes a first adaptor mounting section supporting the first adaptor means and a second adaptor mounting section supporting the second adaptor means.

The second adaptor mounting section is located at an outer end of the tool coupling section of the handle member and has an outer surface defined by a second reduced diameter that is less than the diameter of the first reduced diameter of the first adaptor mounting section of the handle member.

The first adaptor means includes an annular sleeve with an inner diameter effective to cause the first adaptor means to slidingly and removably fit around the first adaptor mounting section of the handle member. The second adaptor means includes connecting means, a flexible portion, and an outer end section. The connecting means is mounted to the second adaptor mounting section of the handle member and the flexible portion extends outwardly from the coupling means to the outer end section of the second adaptor means.

Another feature of the invention comprises a first adaptor member having a shoulder portion and a deformable sleeve portion. The shoulder portion abuts a shoulder surface of the handle member located at the end of the first reduced diameter of the handle member adjacent the hand-grasping section. The deformable sleeve portion collapsibly deforms when the tool coupling section of the handle member is thrust into the handle-receiving socket.

In a specific embodiment, the deformable sleeve portion includes a tapered inside diameter outwardly spaced from the outer surface of the first reduced diameter of the handle member. The shoulder portion includes a ring member with the deformable sleeve member removably mounted to the ring member.

The replacement handle combination of the invention includes a first adaptor mounting section having an outer surface defined by a first diameter that is less than the diameter of the hand-grasping section. The second adaptor mounting section of the handle member is located at an outer end of the tool coupling section and extends outwardly from the first adaptor mounting section. The second adaptor mounting section has an outer surface defined as a second reduced diameter that is less than the diameter of the first reduced diameter of the first adaptor mounting section. First and second adaptor means are effective to fit over the respective first and second adaptor mounting sections.

Thus, the tool combination handle is uniquely designed for universal use on a variety of handle-receiving sockets for tools such as shovels and pitchforks.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

DETAILED DESCRIPTION OF THE INVENTION

Figure 1:
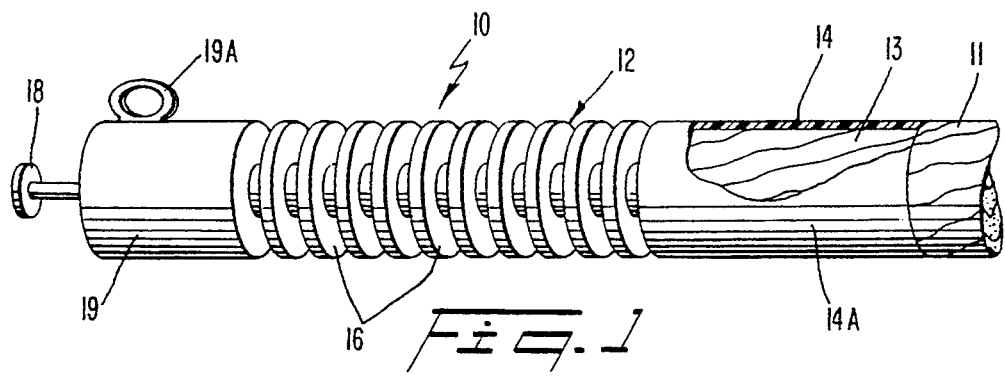
FIG. 1 is an elevational perspective view of an adaptor member of the invention.
Figure 2:
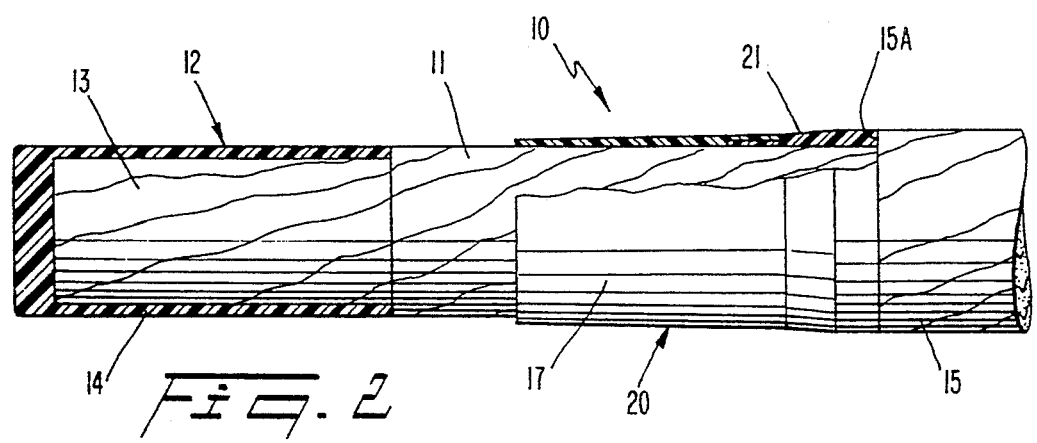
FIG. 2 is a fragmentary cross-sectional view of the tool coupling end of a handle member showing the first and second adaptor means of the invention with the flexible portion removed.
Figure 3:
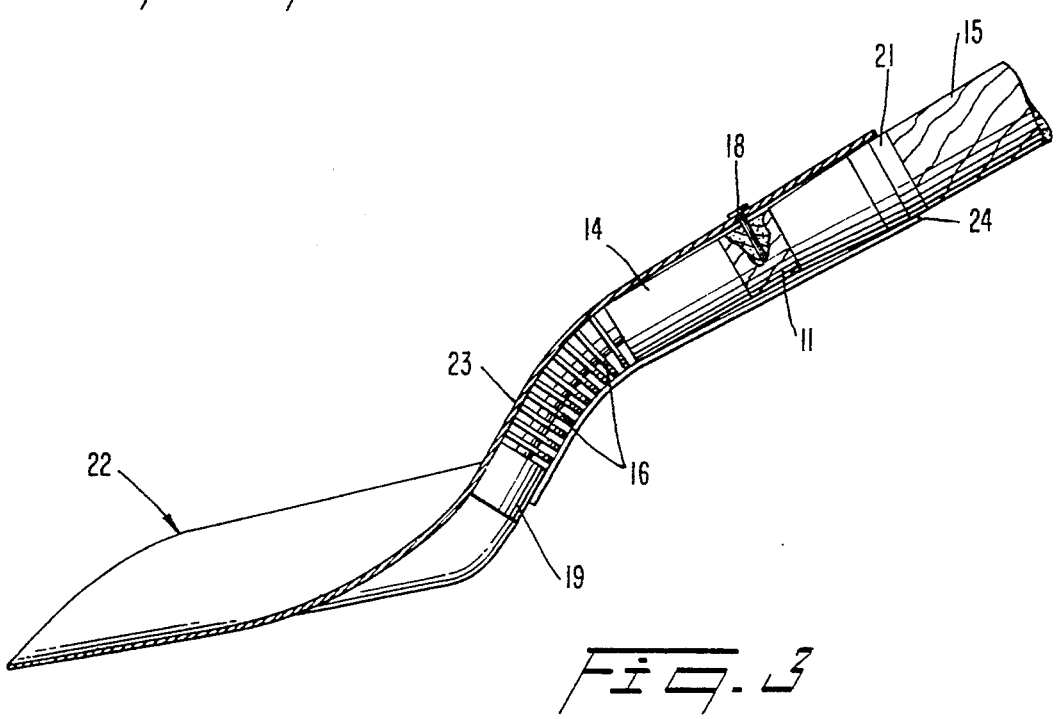
FIG. 3 is a perspective fragmentary sectional view of a hollowback open back shovel with a shoulder fitted with a replacement tool handle combination of the invention.

The replacement handle combination shown in FIGS. 1-3 has a tool coupling section, generally designated 10, at one end thereof and a hand-grasping section 15. Tool coupling section 10 includes a plurality of socket adaptor members 12 and 20 effective to cause the handle to fit a handle-receiving socket 23 of shovel 22.

FIG. 3 shows an assembly of the universal replacement handle combination of the invention in a hollowback shovel 22 having a shoulder 24. Various combinations of the first adaptor member 20 and second adaptor member 12 will be discussed with respect to a Razorback ® open back shovel, a lock socket shovel, a solid socket closedback shovel with a shoulder, and a solid shank closedback without a shoulder.

In this specific embodiment the handle member is composed of wood and the first adaptor member 20 and second adaptor member 12 are composed of injection-molded plastic material such as polypropylene. The first adaptor mounting section 11 supports first adaptor means 20 and the second adaptor mounting section 13 supports second adaptor means 12.

As shown, the second adaptor mounting section 13 is located at an outer end of tool coupling section 10 and has an outer surface defined by a second reduced diameter that is less than the diameter of the first reduced diameter of first adaptor mounting section 11. First adaptor means 20 includes an annular sleeve 17 having an inner diameter effective to cause first adaptor means 20 to slidingly and removably fit around first adaptor mounting section 11.

First adaptor means 20 includes a shoulder portion or ring member 21 and a deformable sleeve member 17. Sleeve member 17 has a tapered inside diameter outwardly spaced from the outer surface of the first reduced diameter of mounting section 11. As is shown in FIG. 2, sleeve member 17 overlaps and slip-fits onto a skirt portion of ring member 21 to form a unitary structure. Ring member 21 generally stays in place for all varieties of the handle-receiving socket. As shown in FIG. 3, when shovel 22 has a shoulder 24, sleeve member 17 is removed and tool coupling section 10 is thrust into the handle-receiving socket 23 and is tightly fitted to ring member 21.

Ring member 21 constitutes a shoulder portion that abuts shoulder surface 15A located at the end of the first reduced diameter 11 of mounting section adjacent hand-grasping section 15. Deformable sleeve member 17 has a structural configuration that collapsibly deforms toward the surface of the mounting section 11 when tool coupling section 10 is thrust into a handle-receiving socket of a shovel having no shoulder at the outer end thereof.

Deformable sleeve 17 has a tapered inside diameter (as shown) outwardly spaced from the outer surface of the first reduced diameter of mounting section 11. As noted, ring member 21 is removably mounted to the deformable sleeve portion 17.

The second adaptor member 12 includes a cup-shaped connecting portion 14 that slidably fits over the outer surface of the second reduced diameter of mounting section 13. Flexible portion 16 of second adaptor member 12 is separable from cup portion 14 as shown in FIG. 2. Removal of flexible portion 16 conforms the handle combination thereby adapting its use with a preselected group of tool handle-receiving sockets.

Tool coupling section 10 includes a first adaptor mounting section 11 supporting first adaptor means 20. As shown, the first adaptor mounting section 11 has an outer surface defined by a first reduced diameter that is less than the diameter of the hand-grasping section 15. Second adaptor mounting section 13 is located at an outer end of the tool coupling section 10 and extends outwardly from the first adaptor mounting section 11. Second adaptor mounting section 13 has an outer surface defined as a second reduced diameter that is less than the diameter of the first reduced diameter of first adaptor mounting section 11.

First adaptor means 20 has a structural configuration effective to slidingly and removably fit around first adaptor mounting section 11. Second adaptor member 12 includes at one end thereof a connecting portion 14 fixedly mounted to the second adaptor mounting section 13 via fastening member 14A driven into the wood of adaptor mounting section 13 as shown in FIG. 1. Second adaptor member 12 further includes an outer end section 19 and flexible portion 16 extending outwardly from connecting portion 14 to the outer end section 19.

The outer end section 19 carries a rivet 18 and a display holding ring 19A. Once purchased and ready for use, ring 19A is simply snapped off outer end section 19, rivet 18 is removed from outer end section 19 and placed in the lower section of first adaptor mounting section 11 as shown in FIG. 3. The series of disks between cup member 14 and outer end section 19 enable adaptor member 12 to be flexible while still maintaining a filling of the space within handle-receiving socket 23 as shown in FIG. 3.

When a solid socket closedback shovel with a shoulder is to be fitted with this replacement handle, the plastic injection-molded sleeve 17 is removed from the handle and the separable portion of adaptor member 12 is broken off and thrust into the handle-receiving socket of the shovel. A 3/16 of an inch hole is drilled through the handle and rivet 18 is inserted therethrough. Sleeve member 17 is removed in the configuration of FIG. 2 so that the handle will fit the lock socket shovel manufactured by Ames, a solid shank closedback shovel manufactured by Union and the Rhino ® shovel of True Temper.

With the combination of structures shown in FIG. 2 wherein the outer flexible portion of the second adaptor member 12 is removed, the handle may be thrust into the handle-receiving sockets of the Ames shovels bearing the trademarks Steel Lite TM, Husky-Bronco, and Pony ®, the Bulldog ®, Bantam ® and Dynalite ® closedback shovels without shoulders made by True Temper.

The hollowback open back shovels having a shoulder as shown in FIG. 3 are fitted by simply removing the removable plastic sleeve 17 from the handle member and thrusting it into socket 23, drilling a 3/16 inch hole through the handle, and inserting rivet 18 as shown. This configuration will fit the Peerless-Ram ® and Dig-Ezy ® shovels made by Ames, the hollowback shovel of True Temper, and the open back shovel manufactured by Union.

With the Razorback ® open back shovel made by Union, none of the parts are removed from the replacement handle. Both sleeve member 17 and ring member 21 and flexible portion 16 remain in place and the entire mechanism is thrust into the handle-receiving socket of the Razorback ® shovel.

Hand-grasping section 15 may be constructed with a D-shaped handle or as a standard long handle for any known shovel. The hand-grasping grasping section 15 of the wood handle has a diameter of about one and one half inches.

While the universal replacement tool handle combination has been shown and described in detail, it is obvious that this invention is not to be considered as limited to the exact form disclosed, and that changes in detail and construction may be made therein within the scope of the invention without departing from the spirit thereof.

Having thus set forth and disclosed the nature of this invention, what is claimed is:

1. A replacement handle combination for tools including pitchforks and shovels having a handle-receiving socket, said handle combination comprising:

a) a handle member, first adaptor means and second adaptor means, said handle member having a tool coupling section at one end thereof and a hand-grasping section with a preselected diameter extending outwardly from the tool coupling section, b) said tool coupling section including a first adaptor mounting section supporting the first adaptor means and a second adaptor mounting section supporting the second adaptor means, c) said first adaptor mounting section of the handle member including an outer surface defined by a first reduced diameter that is less than the preselected diameter of the hand-grasping section, d) said second adaptor mounting section being located at an outer end of said tool coupling section of the handle member and extending outwardly from the first adaptor mounting section, e) said second adaptor mounting section having an outer surface defined as a second reduced diameter that is less than the diameter of a first reduced diameter of the first adaptor mounting section, f) said first adaptor means including a structural configuration effective to slidingly and removably fit around the first adaptor mounting section, g) said second adaptor means including at one end thereof a connecting portion mounted to the second adapter mounting section, an outer end section, and a flexible portion extending outwardly from said connecting portion to said outer end section.

2. The combination as defined in claim 1 wherein
the first adaptor means includes a shoulder portion and a deformable sleeve portion,
the shoulder portion abuts a shoulder surface located at the end of the first reduced diameter of the handle member adjacent the hand-grasping section, and
the deformable sleeve portion has a structural configuration that collapsibly deforms toward the handle member when the tool coupling section is thrust into the handle-receiving socket of the tool.

3. The combination as defined in claim 2 wherein
the deformable sleeve portion has a tapered inside diameter outwardly spaced from the outer surface of the first reduced diameter of the handle member.

4. The combination as defined in claim 3 wherein
the shoulder portion includes a ring member with the deformable sleeve portion removably mounted to the ring member.

5. The combination as defined in claim 1 wherein
the connecting portion of the second adaptor means includes cup means that slidably fits over the outer surface of the second reduced diameter of the handle member.

6. The combination as defined in claim 5 wherein
the flexible portion of the second adaptor means is separable from the cup means for removal of the flexible portion to conform the handle combination thereby adapting its use with a preselected tool handle-receiving socket.

7. The combination as defined in claim 6 wherein
the second adaptor means includes a rivet disposed in an outer end rivet carrying section connected to the flexible portion,
said rivet being effective for use in fixing the tool coupling section of the handle member in the handle-receiving socket of the tool.

8. The combination as defined claim 1 wherein the handle member is composed of wood, and the first and second adaptor means consists of a plurality of individually injection-molded plastic adaptor members.

9. The combination as defined in claim 8 wherein the first adaptor means includes a shoulder portion and a deformable sleeve portion, the shoulder portion abuts a shoulder surface located at the end of the first reduced diameter of the handle member adjacent the hand-grasping section, and the deformable sleeve portion has a structural configuration that collapsibly deforms toward the handle member when the tool coupling section is thrust into the handle-receiving socket of the tool, the deformable sleeve portion has a tapered inside diameter outwardly spaced from the outer surface of the first reduced diameter of the handle member;

the shoulder portion includes a ring member with the deformable sleeve portion removably mounted to the ring member, the connecting portion of the second adaptor means includes cup means that slidably fits over the outer surface of the second reduced diameter of the handle member, and the flexible portion of the second adaptor means is separable from the cup means for removal of the flexible portion to conform the handle combination thereby adapting its use with a preselected tool handle-receiving socket.

10. A replacement handle for use with shovel handle-receiving sockets, said handle comprising:

a) a handle member having a tool coupling section at one end thereof and a hand-gasping section extending outwardly from the tool coupling section, b) said tool coupling section including a plurality of sleeve socket adaptor means effective to cause the handle to fit a handle-receiving socket of a shovel selected from the group consisting of a hollowback shovel with a shoulder, a Razorback ® open back shovel, a lock socket shovel, a solid socket closedback shovel with a shoulder, and a solid shank closedback shovel without a shoulder.

11. A replacement handle as defined in claim 10 wherein the handle member is composed of wood, and the socket adaptor means includes first and second adaptor members composed of injection-molded plastic material.

12. A replacement handle as defined in claim 10 wherein the handle member is wood, the socket adaptor means includes first and second adaptor means, the tool coupling section includes a first adaptor mounting section supporting the first adaptor means and a second adaptor mounting section supporting the second adaptor means.

13. A replacement handle as defined in claim 12 wherein the second adaptor mounting section is located at an outer end of said tool coupling section of the handle member and has an outer surface defined by a second reduced diameter that is less than a first diameter of the first reduced diameter of the first adaptor mounting section of the handle member.

14. A replacement handle as defied in claim 13 wherein the first adaptor means includes an annular sleeve with an inner diameter effective to cause the first adaptor means to slidingly and removably fit around the first adaptor mounting section of the handle member.

15. A replacement handle as defined in claim 14 wherein the second adaptor means includes connecting means, a flexible portion, and an outer end section, the connecting means is fixedly mounted to the second adaptor mounting section of the handle member, and the flexible portion extends outwardly from the connecting means to said outer end section.

16. A replacement handle as defined in claim 12 wherein the first adaptor means includes a shoulder portion and a deformable sleeve portion, said shoulder portion abuts a shoulder surface of the handle member located at the end of a first reduced diameter of the handle member adjacent the hand-grasping section, and the deformable sleeve portion collapsibly deforms when the tool coupling section of the handle member is thrust into the handle-receiving socket.

17. A replacement handle as defined in claim 16 wherein the deformable sleeve portion includes a sleeve member having a tapered inside diameter outwardly spaced from the outer surface of the first reduced diameter of the handle member.

18. A replacement handle as defined in claim 17 wherein the shoulder portion includes a ring member with the deformable sleeve removably mounted to the ring member.

19. A replacement handle as defined in claim 10 wherein the tool coupling section includes first and second adaptor mounting sections, the socket adaptor means includes first and second adaptor means mounted to respective first and second adaptor mounting sections of the handle member.

20. A replacement handle as defined in claim 19 wherein the first adaptor means includes a deformable first adaptor member having a removable sleeve portion and a shoulder portion, the second adaptor means includes a flexible portion and connecting means fixedly attached to the outer surface of a reduced diameter of the handle member, said flexible portion of the second adaptor means is separable from the connecting means for removal of the flexible portion to conform the handle combination for use with a preselected shovel handle-receiving socket.

* * * * *